United States Patent
Doll et al.

[15] 3,659,591
[45] May 2, 1972

[54] ELECTROMAGNETIC FLOWMETER

[72] Inventors: Henri Georges Doll, New york; Hans J. Broner, Glendale, both of N.Y.

[73] Assignee: Doll Research Incorporated, New York, N.Y.

[22] Filed: Aug. 24, 1970

[21] Appl. No.: 66,240

[52] U.S. Cl. .................................. 128/2.05 F, 73/194 EM
[51] Int. Cl. ............................................................ A61b 5/02
[58] Field of Search .................... 128/2.05 F, 2.05 R, 2.05 V, 128/2.05 P, 2 R; 73/194 EM

[56] References Cited

UNITED STATES PATENTS

| | | | |
|---|---|---|---|
| 2,867,119 | 1/1959 | Sturgeon et al. | 73/194 EM |
| 3,131,560 | 5/1964 | Cushman et al. | 73/194 EM |
| 3,184,966 | 5/1965 | Thornton et al. | 73/194 EM |
| 3,377,855 | 4/1968 | Coia et al. | 73/194 EM |

OTHER PUBLICATIONS

Abel, F. L., I.R.E. Trans. on Medical Electronics, Dec., 1959, pp. 216–219.
Spencer, M. P. et al., I. R. E. Trans. on Medical Electronics, Dec., 1959, pp. 220–227.

*Primary Examiner*—Richard A. Gaudet
*Assistant Examiner*—Kyle L. Howell
*Attorney*—Kenyon & Kenyon Reilly Carr & Chapin

[57] ABSTRACT

A noninvasive electromagnetic flowmeter particularly adapted to measure arterial blood flow in human beings is provided. A homogenous magnetic field is produced in the region of the artery under measurement by means of at least one large coil remote from the skin. Blood flow induced signals are sensed by electrodes placed on the skin adjacent the artery and fed to a measurement and control circuit. Electrocardiogram signals sensed by a second pair of electrodes placed on the body near the heart synchronize the operation of this system.

A preferred embodiment of control and measurement system comprises a pair of auxiliary electrodes located where a strong and sharp cardiogram pulse can be repeatedly obtained to be used as a synchronizing signal and as a clock, at least one coil of large enough size having enough turns of wire to be adequate for the production of a strong and homogeneous magnetic field in the region of the artery under study, a source of DC current to feed that coil, means to reverse that DC current after a given number of heart cycles in accordance with a program controlled by the synchronizing signal, a pair of measuring electrodes placed on the skin adjacent the artery, an amplifier to amplify the signal appearing between said measuring electrodes, with filtering means to eliminate the DC unbalance of the electrodes and the high frequency noise, means to paralyze the amplifier and to reverse its output during each current reversal, and means synchronized by the synchronizing signal to average the pulsatile signal measured between the measuring electrodes during successive heart cycles so as to extract the repetitive wave shape of the blood flow pulses from the large random noise in which it is otherwise buried.

15 Claims, 21 Drawing Figures

Patented May 2, 1972

INVENTORS
HENRI GEORGES DOLL
HANS J. BRONER
BY
Kenyon & Kenyon Reilly Carr & Chapin

ATTORNEYS

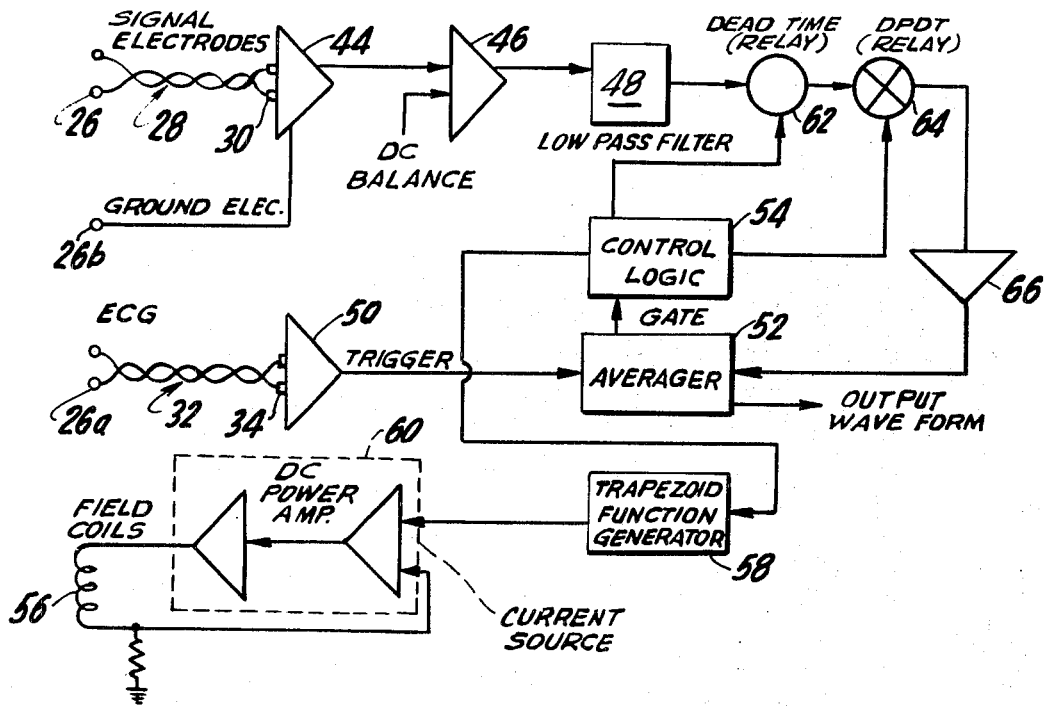
FIG.2
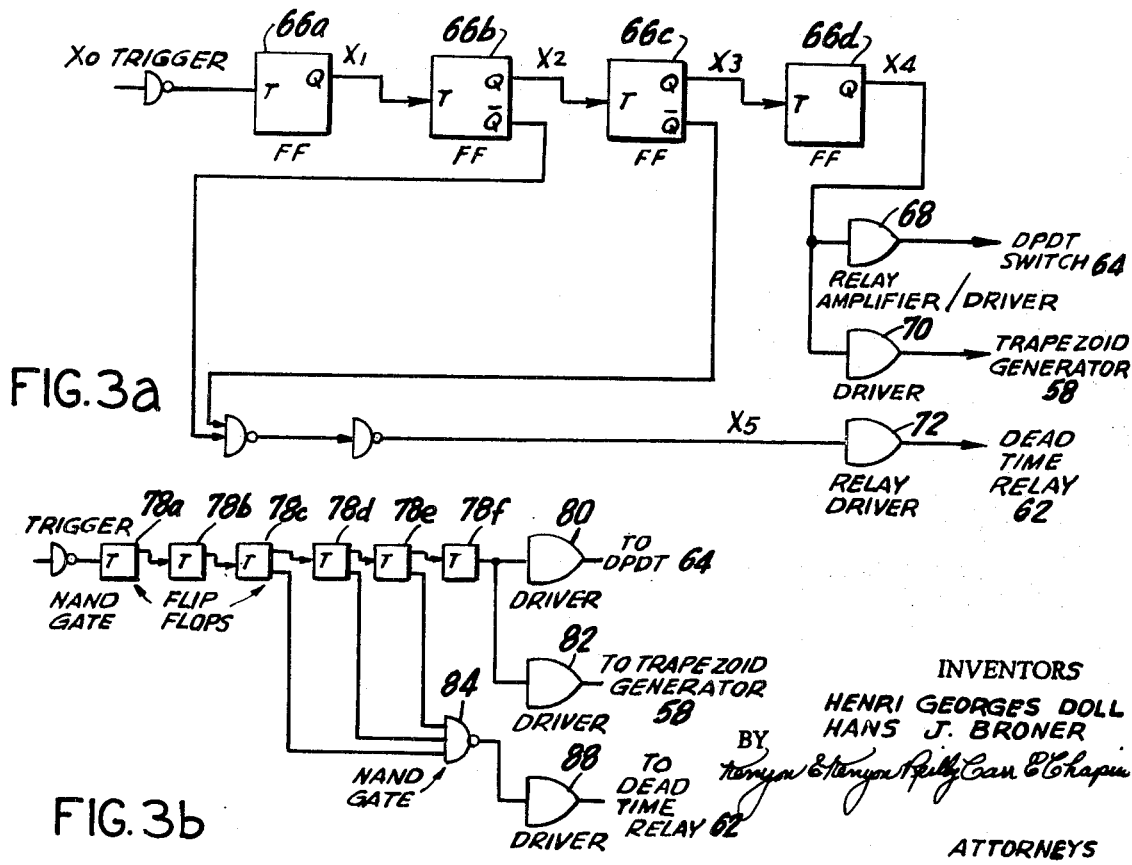
FIG.3a
FIG.3b
INVENTORS
HENRI GEORGES DOLL
HANS J. BRONER
BY
ATTORNEYS

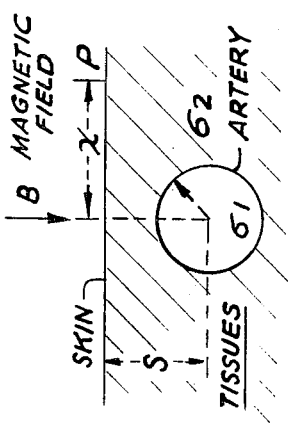
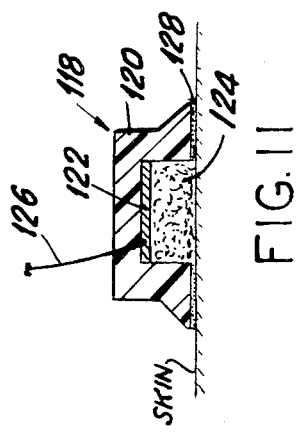
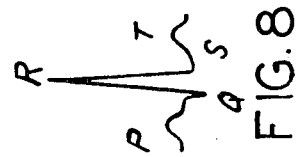
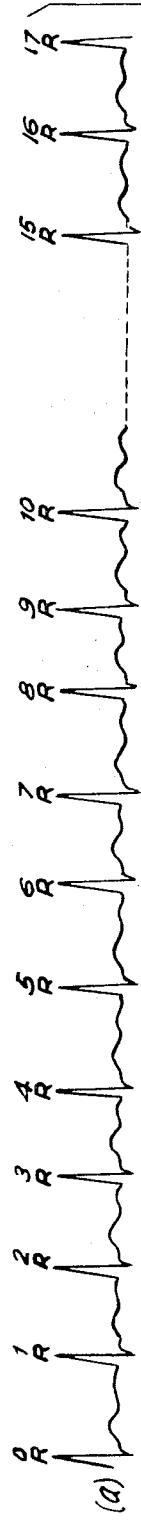
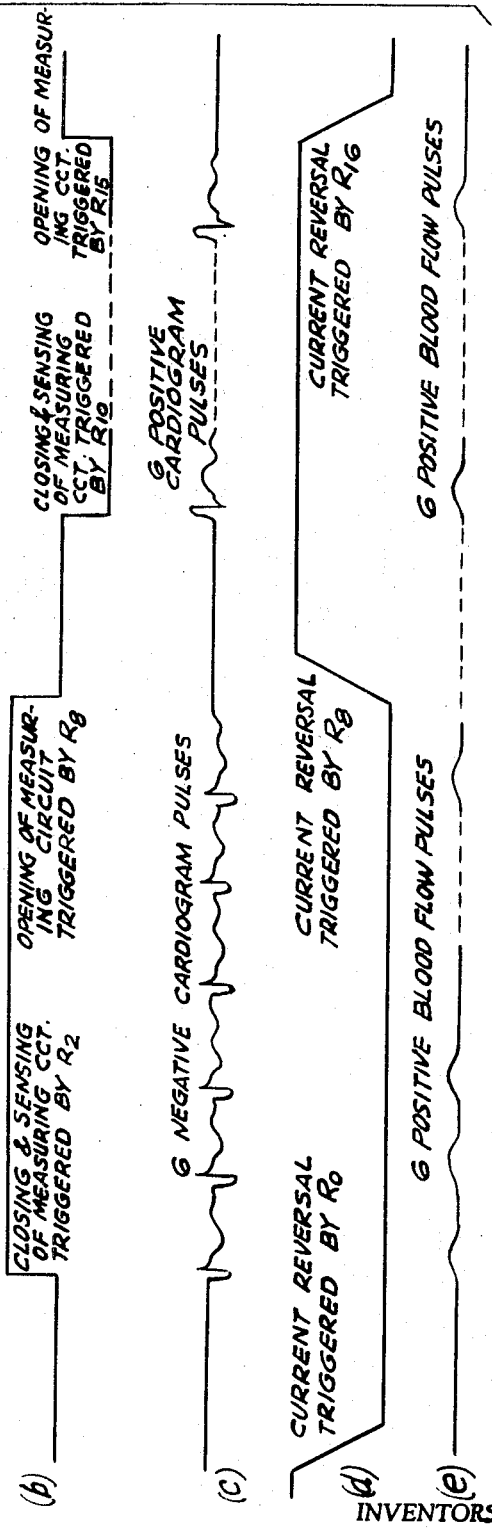

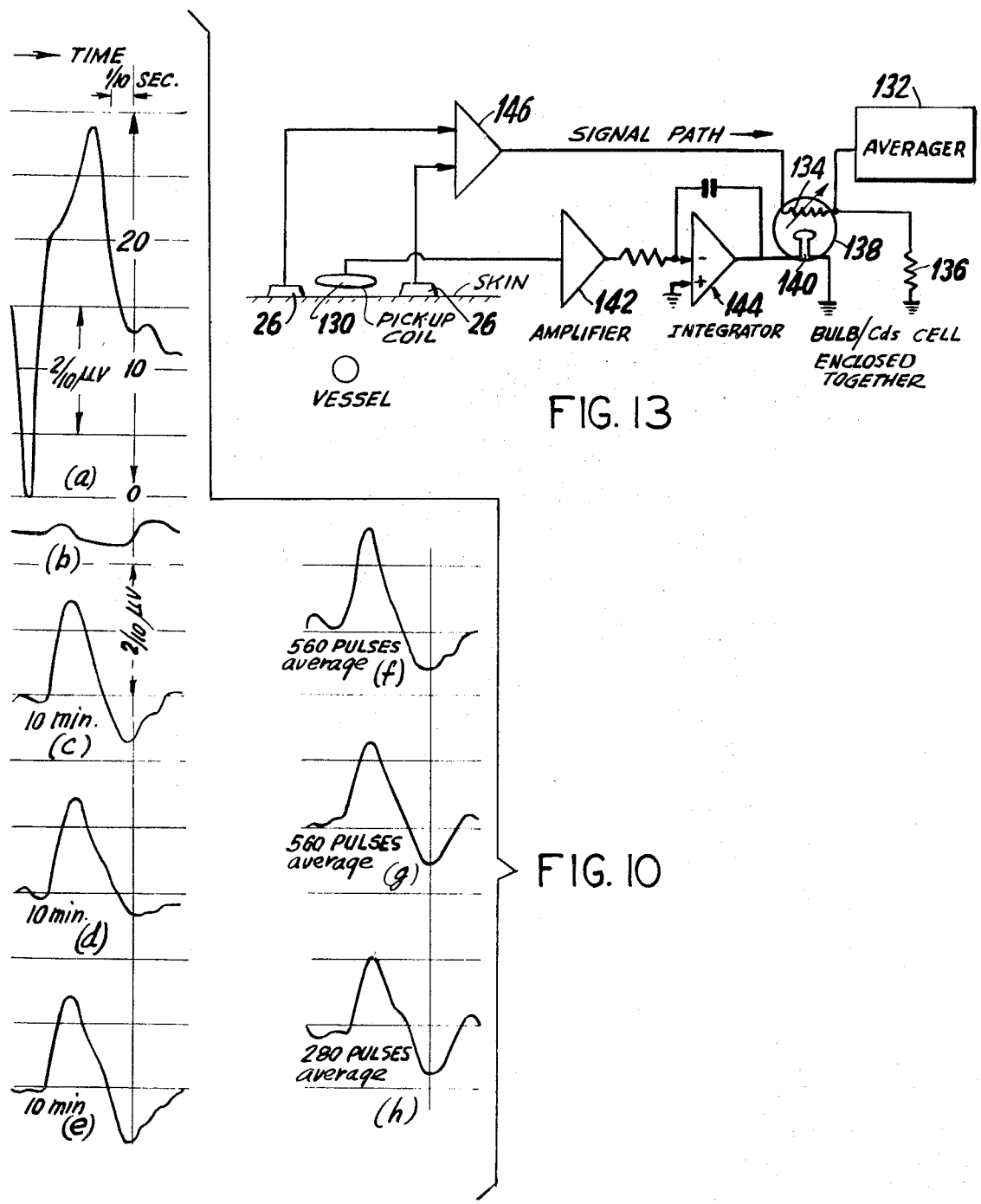

ELECTROMAGNETIC FLOWMETER

FIELD OF THE INVENTION

This invention relates to electromagnetic flowmeters and more particularly to a transcutaneous electromagnetic flowmeter for monitoring the flow pulse in the blood vessels of living beings.

BACKGROUND OF THE INVENTION

In general, electromagnetic flowmeters for the measurement of the blood flow have been invasive, i.e., they have required surgical exposure of the blood vessel under measurement and implantment of at least part of the sensing device about such vessel. Such meters are severely limited in their application and not suitable for clinical use due to the necessity of such surgical procedures and the attendant sterility problems. In addition, not all blood vessels may be exposed in this way since those that have become atherosclerotic are brittle and may be damaged in the implanting procedure. The ugly scars caused by the surgical procedure also dictate against the use of invasive meters except in the most critical cases. For these reasons the invasive flowmeter are rarely used on human beings and are mostly used for experiments on anesthetized animals.

Besides these physical limitations in known electromagnetic flow meters, such meters have also had severe drawbacks in the electronic sensing and measurement system. Since the desired blood flow signal is mixed in with unwanted noise signals created in the body and in the electronic system itself, it has been found difficult to eliminate the noise in order to obtain an accurate blood flow reading. Such noise includes extraneous signals caused by poor placement of the flowmeter around the vessel under measurement, noise created by electrical interaction of the elements of the flowmeter sensor and between the sensor and the tissue with which it is in contact, quadrature effect in sine wave type flowmeters and transformer spikes in square wave type flowmeters.

It is desirable that the blood flow measurement by the flowmeter be taken during a period of constant magnetic field, and that the flowmeter be simple to operate and be capable of monitoring the blood flow in a number of vessels in the same individual.

OBJECTS OF THE INVENTION

It is thus an object of the present invention to provide a non-invasive electromagnetic flowmeter which measures the blood flow in the vessels in living beings without surgical implantation of sensors in the being.

It is a further object of the present invention to provide a non-invasive electromagnetic flowmeter which provides an averaged measurement of the blood flow pulse over a number of heart cycles.

It is another object of the present invention to provide a non-invasive electromagnetic flowmeter which effectively cancels out noise created by the electrocardiogram signal between the blood flow measuring electrodes over a number of heart cycles and which eliminates random noise during that number of cycles by averaging the pulses.

It is yet another object of the present invention to provide a non-invasive electromagnetic flowmeter wherein the measurement and control system is synchronized by means of a reference electrocardiogram signal.

It is still yet another object of the present invention to provide an electromagnetic flowmeter wherein flow induced signals are only measured while the magnetic field is constant and wherein the measurement system is paralyzed reversal of the magnetic field.

It is still a further object of the present invention to provide a non-invasive electromagnetic flowmeter which is simple to operate and which may be used to monitor the blood flow in a plurality of vessels simultaneously or sequentially.

SUMMARY OF THE INVENTION

According to a first aspect of the present invention, a homogeneous magnetic field is created in the region of the blood vessel under measurement by magnetic field producing means situated external of the living being. Blood flow induced electrical signals are sensed by means of sensors placed on the skin of the being in the vicinity of the vessel.

According to one other aspect of the invention these signals are fed to a measurement and control system whose operation is synchronized by means of electrocardiogram signals sensed by a second set of sensors placed on the skin of the being in a location where the electrocardiogram signal is strong and sharp, as, for example, in the vicinity of the heart.

In a preferred embodiment of the measurement and control system, an electromagnetic coil provides a substantially homogeneous magnetic field at the artery to be studied, the coil being fed a stable DC current during blood flow measurement. A plurality of flow induced signals are measured by the first set of sensors and are averaged in an analog measuring circuit to produce an averaged pulse which is a function of the rate of flow in the artery under measurement. The electrocardiogram signals detected by the second set of sensors are utilized to reverse the field of the electromagnet through a suitable control circuit, to reverse the polarity of the analog measuring circuit and to paralyze the measuring circuit during their reversal.

This reversal is accomplished after a given number of electrocardiogram pulses in order that an equal number of cardiogram signals of opposite polarity be stored in the analog circuit thus causing cancellation of the electrocardiogram component of the flow induced signal in the analog measuring circuit. Due to the random nature of the other noise it is eliminated by being averaged out in the analog measurement circuit.

According to a further aspect of the invention the analog measuring circuit is paralyzed during field reversal.

DESCRIPTION OF THE DRAWINGS

FIG. 2 is a block diagram of a preferred embodiment of measurement and control electrical system of the flowmeter of FIG. 1.

FIGS. 3a and 3b are illustrative block diagrams of the control logic circuitry of FIG. 2.

FIG. 7 is a waveform diagram of several of the signals generated in the control logic circuit of FIG. 3a.

FIG. 8 is a representative waveform diagram of the PQRST electrocardiogram signal of the human heart.

FIG. 9 is a waveform diagram of various signals generated in the circuitry of FIG. 2.

FIG. 10a is a waveform diagram of an actual electrocardiogram signal of a human heart measured between two electrodes across the femoral artery.

FIG. 10b is an example of the residual noise signal after reversing and averaging a wave of actual electrocardiogram signals and other noises over a period of approximately ten minutes in the flow meter of FIG. 1 but without applying the magnetic field, and therefore without blood flow signals.

FIG. 10c–h are waveform diagrams of averaged blood flow pulses as measured in the femoral artery of a human being.

FIG. 11 is sectional elevational view of a skin electrode that may be used according to the present invention.

FIG. 12 is a diagrammatic view illustrating the electromagnetic characteristics of blood flow in an artery; and FIG. 13 is a schematic diagram of an electrical circuit that may be used to correct for movement of a patient during blood flow measurement according to the present invention.

DETAILED DESCRIPTION OF THE EMBODIMENTS

Figure 1:
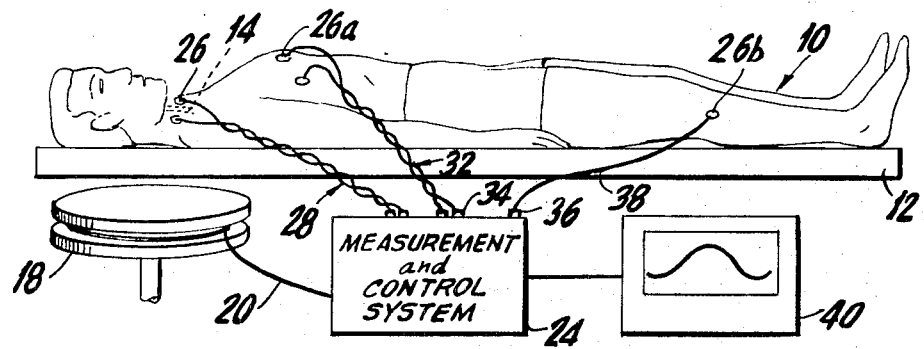
FIGS. 1 and 1a are diagrammatic views of a preferred embodiment of electromagnetic flowmeter according to the present invention illustrating measurement of bloodflow respectively in the carotid and femoral arteries of a human being.

Referring now to the drawings there is shown in FIG. 1, a general diagrammatic view of a preferred embodiment of blood flowmeter according to the present invention used to measure the blood flow rate through the carotid artery of a patient. As shown, a patient 10 is lying in a prone position on an examination table 12. Since it is desired to measure the blood flow rate through the right carotid artery 14 of the patient, a homogeneous magnetic field is created in the region of artery 14 by means of electromagnetic 18. The strength of this magnetic field must be sufficiently large so that a detectable electrical signal induced by the passage of blood in the carotid artery through the magnetic field is present at the skin surface of the neck.

Electromagnet 18 is thus comprised of a coil of heavy gauge wire adapted to carry large amounts of current to create a high intensity magnetic field. It has been found that for the field to be homogeneous in the region of the artery under measurement, the diameter of the coil should be at least twice the distance of the coil from the artery. A homogeneous magnetic field is desirable in order to avoid false readings that may occur if the patient moves his head and thereby changes the location or orientation of the artery in the field. It is also desirable that the magnetic field be roughly perpendicular to the skin and the artery.

In order that measurement may be made of blood flow in different arteries of the patient it may be desirable that more than one electromagnet such as 18 be provided, as for example one for the carotid arteries region and another one for the femoral arteries region.

Current is supplied to electromagnet 18 through electrical conductors 20 from measurement and control system 24. A pair of electrodes 26 is placed on the neck of the patient 10 on either side of the right carotid artery. Electrodes 26 sense an electrical signal that has been induced by the flow of blood in the carotid artery through the homogeneous magnetic field present in the region of the artery. This flow induced signal is fed to system 24 by means of shielded twisted wire pair 28 connected between electrodes 26 and terminals 30 of system 24.

A second pair of electrodes 26a is placed on the chest of patient 10 and sense the large electrocardiogram signals produced by the heart at that location. Shielded twisted wire pair 32 connected between chest electrodes 26a and terminals 34 of system 24 carries these signals to system 24.

Since it is desirable that system 24 be at the same ground potential as patient 10, ground electrode 26b is placed on the leg or arm of patient 10 and connected to ground terminal 36 of system 24 by conductor 38. Electrode 26b is preferably placed on a portion of the body which is removed from electrodes 26 and 26a.

The blood flow diagram produced by system 24 may be recorded on a strip chart recorder 40, may be displayed on a visual display device such as an oscilloscope (not shown) or may be recorded on a suitable recording media such as magnetic tape either directly or after being converted to digital data for use in a digital computer by well known analog-digital conversion devices.

Figure 1A:
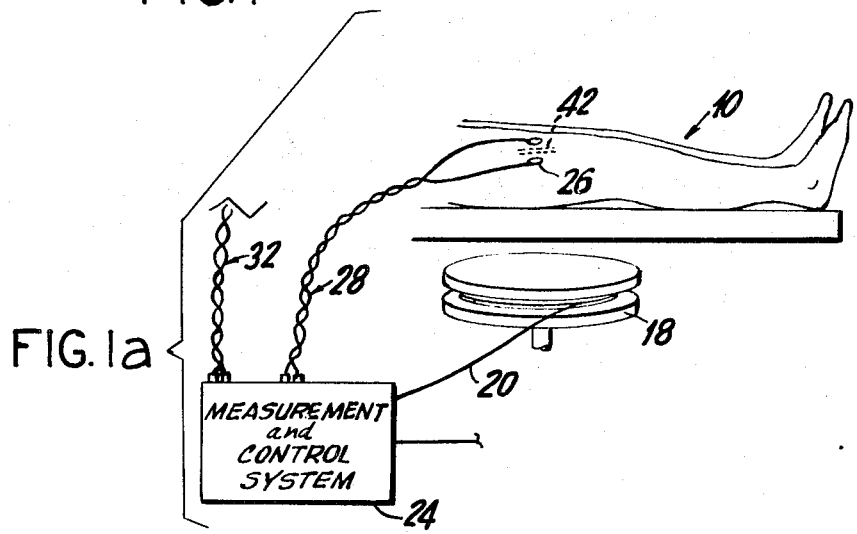

FIG. 1a shows the relative positioning of electromagnet 18 for the measurement of blood flow through the right femoral artery 42 of patient 10 and also the relative positioning of electrodes 26 for sensing the flow induced signal.

In general, the blood flow induced signal sensed by electrodes 26 will contain a number of noise components in addition to the component which is a function of the blood flow in the artery. The main noise component is the electrocardiogram signal produced by the heart which can have a strength many times that of the flow induced signal especially at an artery close to the heart such as the carotid artery.

It has been found that, since it is not necessary to display each individual blood flow pulse, these pulses with proper synchronizing based on the reference cardiogram may be averaged over a long period, such as one or several minutes to progressively build up an average pulse with the wave form and cleared from noise. The cardiogram noise cancels out because all the cardiogram pulses are identical and synchronized in the averager, but one half of them with one polarity, and the other half of them with the opposite polarity. The random noise does not build up in the averager, because it is not synchronized, and its effect becomes practically negligible if the averaging lasts long enough.

Referring now to FIG. 2 there is shown a preferred embodiment of measurement and control circuit 24. The blood flow induced signal sensed by electrodes 26 is fed by wire pair 28 to the input terminals 30 of preamplifier 44. As described above, a common ground is maintained between the patient and circuit 24 by means of electrode 26b placed on the skin of the patient, ground wire 38 and ground terminal 36 of preamplifier 44. After the flow induced signal has been amplified by preamplifier 44 it is further amplified by DC amplifier 46. This signal is then filtered by low pass filter 48 which filters out all high frequency noise components including any noise component that may be produced by the power line frequency.

The electrocardiogram signal sensed by electrodes 26a is fed to terminals 34 of preamplifier 50 by twisted wire pair 32. After the cardiogram signal has been amplified by preamplifier 50 it is fed to averager 52 and thence to control logic circuit 54 to be used to synchronize the operation of the various functions of system 24.

A reversible steady state DC current is supplied to field coil 56 of electromagnet 18 by means of trapezoid function or ramp generator 58 connected to current source 60 which in turn supplies current to coil 56. Generator 58 is connected to control logic circuit 54 which controls the operation thereof.

After the blood flow signal is filtered by filter 48, it is fed through a dead time relay 62 and a double pole – double throw (DPDT) relay 64 to differential amplifier 66 where it is amplified and then fed to averager measuring circuit 52. Relays 62 and 64 are also connected to and controlled by control logic 54.

In a known type of analog measuring averager, the Model T DH–9 Waveform Eductor manufactured by Princeton Applied Research Corporation of Princeton, New Jersey, a repetitive input waveform to be measured is divided into 100 increments of equal duration and stored in a 100 channel capacitor memory. After a sufficient number of repetitions the voltage level on each capacitor will be proportional to the average value for that segment of the waveform. Random noise and non-synchronous signals are eliminated and the desired signal can be read out on a chart recorder or oscilloscope.

The operation of the electromagnetic flow meter as shown in FIGS. 1 and 2 may be understood by referring to the waveform diagrams of FIG. 9. FIG. 9a shows a series of reference electrocardiogram signals having the general shape of the waveform PQRST shown in FIG. 8. The electrocardiogram signal is characterized by a sharp spike at R which is used to trigger measurement and control system 24 and synchronize the operation of the various components thereof. This synchronization on the R line is desirable since the heart beats at irregular intervals. In general, the sequence of operation of the flowmeter is caused to be repeated after a given number of heart cycles. In the example shown in FIG. 9, this repetition occurs every 16 heart beats.

At $R_0$ the control logic circuit 54 causes the current in field coil 56 to be reversed by reversing trapezoid function generator 58 and also causes the polarity of the measuring circuit 60 be reversed by activating relay 64. Control logic circuit 54 also causes relay 62 to stay open from $R_0$ to $R_2$ so that no signals are fed to averager 52 during this period of time. This is to prevent unwanted noise caused by the field reversal to be fed to averager 52 and to allow the system to return to a steady state condition before measurement of the blood flow signals is resumed. As shown in FIG. 9d the current is reversed at $R_0$ and the system allowed to stabilize between $R_1$ and $R_2$.

At $R_2$, control logic circuit 54 causes relay 62 to close (FIG. 9d) thus allowing the blood flow signals to be fed into averager 52. FIGS. 9c and 9e show the two main components of the signal, 9c showing the electrocardiogram noise component which is to be cancelled out and FIG. 9e the desired blood flow induced component which is to be measured.

During the interval from $R_2$ to $R_8$, a steady state DC current is supplied to coil 56 of electromagnet 18 which in turn creates a stable and uniform homogeneous magnetic field in the region of the artery (or arteries) under measurement. Since the averager 52 is operated in synchronism with the flow induced signals by means of the reference electrocardiogram signals sensed by electrodes 26a, six flow induced pulses will be introduced into averager 52 during this interval.

As shown, the direction of the magnetic field and polarity of relay 64 cause six pulses having six negative cardiogram components (FIG. 9a and six positive blood flow components to be loaded on the condensers of averager 52.

At $R_8$, control logic circuit 54 causes generator 58 to reverse, thus causing the current through coil 56 to reverse and the magnetic field to reverse. Reversal of the polarity of the magnetic field causes a reversal of the polarity of the magnetic field - induced components, but does not affect the polarity of the electrocardiogram components. Circuit 54 also causes relay 64 to operate in order to reverse the polarity of the signals fed to averager 52 and causes relay 62 to be opened between $R_8$ and $R_{10}$ to prevent the feeding of blood flow signals to averager 52. The relay operating times are chosen so that the dead-time relay operates before the others.

By $R_9$ (FIG. 9d), the field current has reversed and it is completely stabilized at $R_{10}$.

At $R_{10}$, control logic circuit 54 causes relay 62 to close, to permit blood flow pulses to be fed to averager 52 once again. During the interval from $R_{10}$ to $R_{16}$, six signals are fed to averager 54. However, since the magnetic field has been reversed as well as the polarity of the signals fed to averager 52, the six signals will have six positive electrocardiogram components and six positive blood flow components.

This is because the positive blood flow components were reversed in polarity a total of two times; first, due to a reversal in the polarity of the magnetic field, and second, due to the electrical switching of the polarity of the electrical signal fed to the averager 52. The positive electrocardiogram components were reversed in polarity a total of only one time, this reversal being produced by the electrical switching of the polarity of the signals fed to averager 52. These six positive cardiogram signals will cancel out the six negative cardiogram signals fed in during the interval from $R_2$ to $R_8$ thus eliminating the cardiogram noise component from the desired flow pulse. The six blood flow components will be added to the previously obtained six flow components to produce 12 blood flow pulses loaded on the condensers of averager 52 free of electrocardiogram noise.

At $R_{16}$, control logic circuit 54 causes a repetition of the events which took place at $R_0$.

Thus, during a cycle of 16 heart beats, 12 pulses have accumulated in averager 52 and the signals during four of the 16 heartbeats have been ignored. Measurement has only taken place when the magnetic field is constant and has been ignored during periods of current reversal when conditions are unstable. In this manner, an accurate measurement of the blood flow pulse is obtained and reliability of the measuring circuit is assured.

This cycle is repeated over a long enough period of time to give a good average reading of the blood flow pulse in the artery under measurement. Since the average heart beats in the range of from 60 to 100 beats per minute (under 2 hz.) a reading over a period of 1–10 minutes should provide an averaged blood flow waveform which is a function of the actual blood flow in the artery under measurement.

As an example, FIG. 10 in which the signal scale is 0.1 microvolt per division for all curves, shows the results of a number of actual measurements of blood flow in the right femoral artery of a man. FIG. 10a is the waveform of the averaged electrocardiograms recorded between the electrodes across the femoral artery in the absence of magnetic field. FIG. 10b is the residual cardiogram noise signal after reversing and averaging equal numbers of positive and negative cardiogram pulses and other noise over a period of approximately ten minutes also in the absence of magnetic field.

FIG. 10c – e are resultant blood flow waveforms of three different measurement periods of approximately 10 -minute durations. FIG. 10f and g are resultant waveforms of 560 averaged pulses and FIG. 10h is the resultant waveform of 280 averaged pulses. It will be noted that the six waveforms are substantially similar and thus may be said to provide a good indication of the blood flow pulse in the artery being measured.

When measurements are taken at periodic intervals, a decrease in the peak to peak amplitude between the positive and negative peaks would indicate that the blood flow in the artery was decreasing thus giving an important warning to the physician.

Where blocking condensers are used in the preamplifiers and amplifiers which amplify the blood flow signal, control logic circuit 54 will cause preamplifier 44 to be paralyzed during current reversal to prevent charging of the condensers by the transients produced during reversal and the residual discharge thereof during the measuring intervals.

Figure 7:
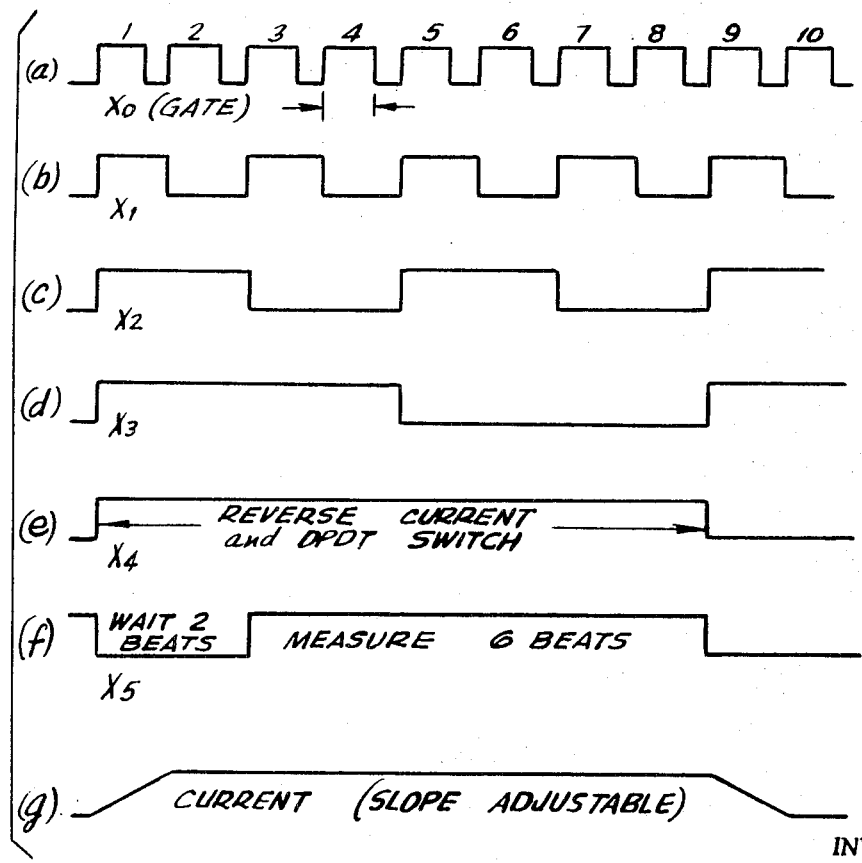

Referring now to FIG. 3a there is shown in greater detail one circuit which may be used for control logic circuit 54 to control the operation of system 24 over the 16 heart beat cycle described hereinabove and to FIG. 7 which shows waveforms of various signals produced in the circuit of FIG. 3a. As shown in FIG. 3a, four flipflops 66a, 66b, 66c and 66d are connected in sequence and produce the voltage signals shown in FIG. 7.

FIG. 7a shows the voltage $X_0$ fed to the input of flipflop 66a, this voltage comprising a series of square pulses which are of the same frequency as and which have been formed from the R spikes of the electrocardiogram signals sensed by electrode 26a.

As is well known, the voltage signal produced by each successive flipflop in a chain will have a frequency one-half the frequency of the trigger voltage signal applied to the input of the flipflop. Thus, the voltage $X_1$ (FIG. 7b) produced by flipflop 66a has one half the frequency of triggering voltage $X_o$; the voltage $X_2$ (FIG. 7c) produced by flipflop 66b has one half the frequency of triggering voltage $X_1$; the voltage $X_3$ (FIG. 7d) produced by flipflop 66c has one half the frequency produced by triggering voltage $X_2$; and the voltage $X_4$ (FIG. 7e) produced by flipflop 66d is one-half the frequency of triggering voltage $X_3$.

Voltage signal $X_4$ is supplied to relay amplifier/driver 68 which triggers DPDT relay 64 and to driver 70 which triggers generator 58.

Voltage signal $X_5$ (FIG. 7b) is derived from flipflop 66b and 66c and is supplied to relay driver 72, which drives dead time relay 62.

FIG. 7g shows the current waveform supplied to coil 56 by current source 60.

FIG. 3b shows in detail another circuit which may be used for control logic circuit 54 in order to produce a measuring cycle extending over 64 heart beats wherein during each half cycle 4 beats are used to allow stabilization of current during reversal and 28 beats are used to measure the blood flow signal during current steady-state conditions. Thus during each measuring cycle 28 negative and 28 positive electrocardiogram components are cancelled out in averager 52 and 56 positive blood flow pulses are loaded on the condensers of averager 52.

As shown, the control logic circuit comprises a chain of flipflops 78a, 78b, 78c, 78d, 78e, 78f sequentially connected together. The voltage signal produced at the output of flipflop 78f is used to trigger relay 62 and generator 58 by means respectively of drivers 80 and 82. The voltage signal to trigger dead time relay 62 is derived from flipflops 78c, 78d and 78e applied to relay 82 through NAND gate 84 and driver 88.

Figure 4:
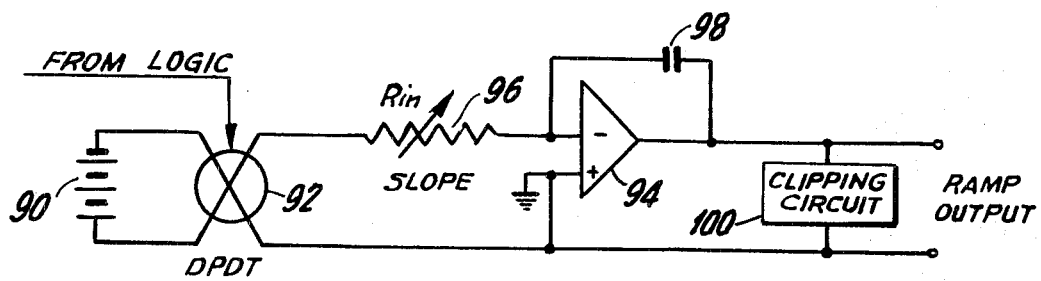
FIG. 4 is an illustrative schematic diagram of the trapezoid function generator of FIG. 2.

FIG. 4 shows schematically one circuit that may be used for trapezoid function or ramp generator 58. A source of DC such as battery 90 is connected to DPDT switch 92 which is connected to operational amplifier 94 by means of adjustable resistor 96 which is connected to the negative input terminal of amplifier 94 and through ground to the positive input terminal thereof. A capacitor 98 is connected between the negative input and output terminals of amplifier 94. Clipping circuit 100 is connected to the output of amplifier 94.

In operation, when a trigger signal is received from logic circuit 54 to reverse DPDT switch 92 the voltage applied to amplifier 94 from battery 90 is also reversed. If it is assumed that the gain of amplifier 94 is high, its input impedance is high and its output impedance is low, then the shape of the output voltage will be determined by the values of resistor 96 and capacitor 98 according to the following formula, $$E_{out} = \frac{-1}{RC} \int_0^t E_{in} dt$$

where
R is the value of resistor 96
C is the value of capacitor 98
$E_{in}$ is the value of the voltage of battery 90
$E_{out}$ will have a slope determined by the value of 1/RC.
Thus by changing the value of variable resistor 96 the slope of $E_{out}$ may also be changed.

Clipping circuit 100 determines the voltage at which the ramp is stopped and represents the steady state voltage which is supplied to current source 60.

Figure 5:
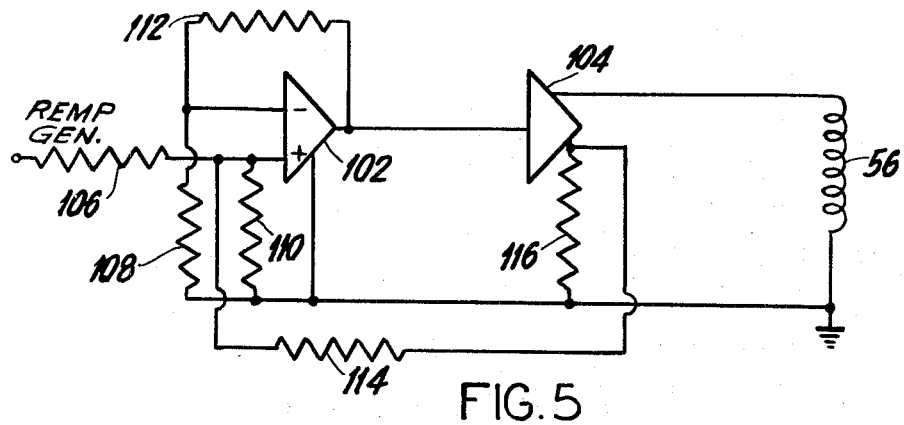
FIG. 5 is an illustrative schematic diagram of the current source of FIG. 2.

FIG. 5 shows schematically a circuit that may be used for current source 60. The function of current source 60 is to supply a constant DC current to coil 56 in order to produce a constant magnetic field during the period when blood flow is being measured. It is also desirable that the current through coil 56 be stabilized before the measurement interval begins.

Current source 60 basically comprises operational amplifier 102 in cascade with power amplifier 104 the output of which is connected to coil 56. Suitable input resistors 106, 108 and 110 and feedback resistors 112 and 114 well known to those skilled in the art are also provided and will not be described in detail here. As shown the output of ramp generator 58 is connected to the positive input terminal of amplifier 102 by means of resistor 106.

Figure 6:
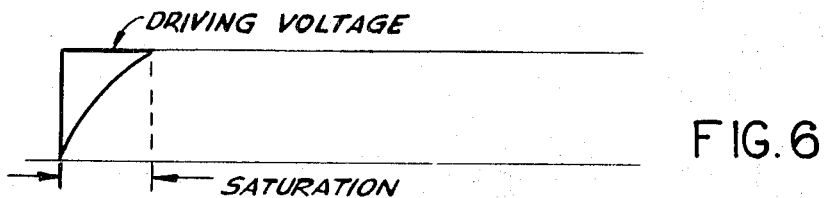
FIG. 6 is a waveform diagram of one of the signals generated in the circuit of FIG. 4.

In order to speed up the time in which the current through coil 56 reaches a steady state value resistor 116 is provided in the output circuit of amplifier 104. Since the current passing through coil 56 also passes through resistor 116, a negative voltage is developed across resistor 116 which is fed back to the input to effectively decrease the natural time constant of coil 56. Thus the current on reversal reaches its steady state value quicker than if resistor 116 were not provided. FIG. 6 illustrates the waveforms of the driving voltage and current on reversal.

FIG. 11 shows an electrode which may be used as the sensor electrode 26 according to the present invention. The purpose of the electrode is to obtain the maximum electrical contact with the skin on which it is placed. Electrode 118 comprises cup shaped plastic housing 120 having metallic electrode film 122 on the interior thereof covered with conductive jelly 124. Electrode film 122 is of a non-polarisable nature such as a silver-silver chloride lattice. Lead wire 126 is soldered to electrode film 122 and carried out through housing 120. The electrode may be secured to the skin of a patient by a suitable adhesive 128 which may be coated on the bottom of housing 120.

The conductive jelly 124 will mold itself to imperfections in the skin and provide maximum contact between the skin and electrode film 122.

FIG. 12 diagrammatically illustrates the optimum placement of electrodes 26 with respect to the artery under measurement. Ideally, the magnetic field B is perpendicular to the skin and homogeneous in the region of the artery. The ideal position P at which one of the electrodes should be placed is that point above the artery where the induced electrical voltage is at a maximum or minimum. This point may be derived as follows:

The voltage $V_x$ at point P on the skin surface is given by the following formula:

$$V = \frac{B}{\pi} \frac{1}{1 + \frac{G2}{G1}} [Q - \pi a^2 v_s] \frac{2X}{X^2 + S^2}$$

where:
B is the magnetic field strength in Webers per square meter
$V_x$ is the voltage at point P in volts
Q is the blood flow in the artery in cubic meters per second
G1 is the electrical conductivity of blood
G2 is the electrical conductivity of tissues
$V_s$ is the slip velocity at the artery wall in meters per second, which is known to be very close to zero because of the laminar flow conditions
A is the radius of the artery in meters
S is the distance from the center line of the artery to the skin surface in meters
X is the distance on the skin from point P to a line passing through the center of the artery in meters The formula shows that maximum and minimum voltages occur at two points on either side of the artery where $X = S$. Thus, optimally, electrodes 26 should be placed at these points in order to achieve the greatest blood flow signal.

Although it is desirable that a patient remain in one position while blood flow is being measured, this may not always be possible and there is a likelihood especially in measurement of the blood flow in the carotid arteries that the patient will move his head during the measurement cycle. This movement will change the orientation of the blood vessel in the magnetic field thus changing the strength of the signal picked up by the electrodes.

FIG. 13 shows in simplified form a circuit which may be used to control the gain of the measurement system in response to moderate position changes of a patient. A pickup coil 130 is placed on the skin between electrodes 26.

In order to assure that the blood flow signal provided to averager 132 is maintained at a constant level despite changes of position of the artery and skin in the magnetic field, a voltage divider network comprising photoconductive cell 134 and resistor 136 is connected to the input of the averager. Cell 134 is enclosed within casing 138 with a bulb 140. Coil 130 is connected to the filament of bulb 140 by means of amplifier 142 and integrator 144.

A blood flow signal path is provided from electrodes 26 to averager 132 through amplifier 146 and the variable resistance of cell 134.

In operation, when there is a change in position by the patient, coil 130 will be moved in the magnetic field and an emf dv/dt will be induced in coil 130. This emf is amplified by amplifier 142 and integrated in integrator 144 to produce a voltage proportional to position. This voltage is applied to the filament of bulb 140 and controls the brightness thereof which in turn determines the resistance of the photoconductive cell in the voltage dividing network. In this manner, when the flow induced signal picked up by electrodes 26 is weak, the gain of the circuit will be increased and when the signal is strong the gain will be decreased thus maintaining a signal of constant strength to averager 132.

Since generally it is only necessary to monitor the blood flow in any given artery every 20 to 30 minutes and since the measurement interval by the flowmeter described hereinabove may only be five or ten minutes and can be reduced if the magnetic field is increased, it is possible to use the same averager and indicator system for sequentially monitoring the blood flow in several vessels. In such a case, a pair of electrodes must be provided for each artery to be studied, and means must be provided to switch the input of amplifier 44 from one pair of electrodes to the next one sequentially according to a cycle program.

Although the electromagnetic flowmeter according to the present invention has been particularly described in connection with an analog averager an analog to digital converter in combination with a digital computer properly synchronized by the signal of the reference electrocardiogram may be substituted for the analog averager.

What is claimed is:

1. An electromagnetic flowmeter for measuring the blood flow pulse in a blood vessel of a living being comprising first sensing means adapted to be positioned on the being at a location where a strong and sharp cardiogram pulse can be repeatedly obtained, means connected to said first sensing means for providing a synchronizing signal and a clock, means for producing a strong and homogeneous magnetic field in the region of said vessel, means for reversing said magnetic field after a given number of heart cycles in accordance with a program controlled by said synchronizing signal, second sensing means adapted to be placed on said being at a location adjacent said vessel, amplifier means for amplifying the signal sensed by said second sensing means, means to paralyze said amplifier means and to reverse its output during reversal of said magnetic field and means synchronized by the synchronizing signal for averaging the pulsatile signal sensed by said second sensing means during successive heart cycles so as to extract the repetitive wave shape of the blood flow pulses from the random noise in which it is otherwise buried.

2. The electromagnetic flowmeter of claim 1 wherein said first sensing means comprises a pair of electrodes.

3. The electromagnetic flowmeter of claim 1 wherein said magnetic field producing means comprises an electromagnet having at least one coil of large enough size having enough turns of wire to produce said strong and homogeneous magnetic field.

4. The electromagnetic flowmeter of claim 3 including a source of DC current to feed DC current to said at least one coil.

5. The electromagnetic flowmeter of claim 4 wherein said magnetic field reversing means includes means to reverse the polarity of the DC current fed to said at least one coil repeatedly after a given number of heart cycles in accord with said program controlled by said synchronizing signal.

6. The electromagnetic flowmeter of claim 5 wherein said paralyzing means paralyzes said amplification means and reverses its output during reversal of the DC current fed to said at least one coil.

7. The electromagnetic flowmeter of claim 1 including filtering means for eliminating the DC unbalance of said second sensing means and for eliminating high frequency noise from the signal sensed thereby.

8. The electromagnetic flowmeter of claim 1 wherein said second sensing means comprises a second pair of electrodes adapted to be placed on the being adjacent the blood vessel under study.

9. The electromagnetic flowmeter of claim 1 wherein said averaging means comprises analog averaging means.

10. The electromagnetic flowmeter of claim 1 wherein said averaging means comprises digital averaging means.

11. The electromagnetic flowmeter of claim 1 including ground electrode means adapted to be positioned on said being remote from said first and second sensing means and connected to said amplifier means.

12. The electromagnetic flowmeter of claim 1 including means for maintaining the signal supplied to said averaging means substantially constant despite moderate changes of position by the being in the magnetic field.

13. An electromagnetic flowmeter for measuring the blood flow pulse in a blood vessel of a living being comprising a first pair of electrodes adapted to be positioned on the being at a location where a strong and sharp cardiogram pulse can be repeatedly obtained, means connected to said first pair of electrodes for providing a synchronizing signal and a clock, and electromagnet having at least one coil of large enough size and having enough turns of wire to be adequate for the production of a strong and homogeneous magnetic field in the region of the blood vessel under study, a source of DC current to feed DC current to said at least one coil of said electromagnet, means to reverse the polarity of said DC current after a given number of heart cycles in accordance with a program controlled by said synchronizing signal, a second pair of electrodes adapted to be placed on said being adjacent said blood vessel, an amplifier to amplify the signal appearing between said second pair of electrodes, filtering means for eliminating the DC unbalance of said second pair of electrodes and for eliminating the high frequency noise from the signal sensed thereby, means to paralyze the amplifier and to reverse its output during current reversal, and means synchronized by the synchronizing signal for averaging the pulsatile signal measured between said second pair of electrodes during successive heart cycles so as to extract the repetitive wave shape of the blood flow pulses from the random noise in which it is otherwise buried.

14. The electromagnetic flowmeter of claim 13 wherein said averaging means comprises analog averaging means.

15. The electromagnetic flowmeter of claim 13 wherein said averaging means comprises digital averaging means.

* * * * *